US012771428B2

(12) United States Patent
Pick et al.

(10) Patent No.: US 12,771,428 B2
(45) Date of Patent: Oct. 20, 2026

(54) REPORTING A PER CODEWORD CAPACITY RATIO METRIC FOR IMPROVED WIRELESS COMMUNICATIONS

(71) Applicant: QUALCOMM Incorporated, San Diego, CA (US)

(72) Inventors: Jacob Pick, Mevaseret Zion (IL); Assaf Touboul, Netanya (IL); Shay Landis, Hod Hasharon (IL); Peer Berger, Hod Hasharon (IL); Tomer Geva, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 18/450,971

(22) Filed: Aug. 16, 2023

(65) Prior Publication Data

US 2025/0062812 A1 Feb. 20, 2025

(51) Int. Cl.
*H04B 7/06* (2006.01)

(52) U.S. Cl.
CPC ......... *H04B 7/0639* (2013.01); *H04B 7/0626* (2013.01)

(58) Field of Classification Search
CPC ... H04B 7/0639; H04B 7/0626; H04B 7/0628
See application file for complete search history.

(56) References Cited

U.S. PATENT DOCUMENTS

2010/0188966 A1* 7/2010 Pun ...................... H04B 7/0478 370/329
2017/0272220 A1* 9/2017 Chen .................... H04B 7/0617
2019/0020515 A1* 1/2019 Yoshizawa .......... H04L 27/2602
2019/0349057 A1* 11/2019 Davydov ............. H04B 7/0632
2022/0393781 A1* 12/2022 Kim ......................... G06N 3/08
2024/0365312 A1* 10/2024 Lin ....................... H04L 5/0064

* cited by examiner

*Primary Examiner* — Derrick W Ferris
*Assistant Examiner* — Jesse P. Samluk
(74) *Attorney, Agent, or Firm* — Holland & Hart LLP

(57) ABSTRACT

Methods, systems, and devices for wireless communications are described. For instance, a user equipment (UE) may transmit a first report indicating a capability to support per codeword demodulation for a set of codewords, a second type of demodulation for the set of codewords, or both. The UE may receive, based on transmitting the first report, the set of codewords over a set of spatial streams in accordance with the per codeword demodulation or the second type of demodulation. The UE may transmit a second report indicating a capacity ratio metric for each codeword of the set of codewords based on receiving the set of codewords over the set of spatial streams in accordance with the per codeword demodulation or the second type of demodulation.

30 Claims, 13 Drawing Sheets

REPORTING A PER CODEWORD CAPACITY RATIO METRIC FOR IMPROVED WIRELESS COMMUNICATIONS

FIELD OF TECHNOLOGY

The following relates to wireless communications, including reporting a per codeword capacity ratio metric for improved wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a user equipment (UE) may receive codewords from a network entity and may process the codewords. As a quantity of codewords that the UE receives in a single message increases, a complexity associated with processing the codewords may increase. Increased complexity may be associated with increased latency for processing the codewords and/or a decreased likelihood that the UE successfully decodes the codewords. Thus, techniques that process the codewords with decreased complexity may increase the efficiency of wireless communications.

SUMMARY

The described techniques relate to improved methods, systems, devices, and apparatuses that support reporting a per codeword capacity ratio metric for improved wireless communications. For example, the described techniques provide for reporting of a codeword capacity ratio metric value to enable reduced codeword processing complexity while limiting losses in throughput. In some examples, a user equipment (UE) may receive multiple codewords from a network entity over a set of spatial streams. To demodulate the multiple codewords, the UE may perform per codeword demodulation or full rank demodulation. Performing per codeword demodulation may include identifying a separate signal associated with each codeword of the multiple codewords as part of demodulation, whereas full rank demodulation may include identifying a single signal for the multiple codewords as part of demodulation. In some examples, performing per codeword demodulation may enable decreased complexity associated with decoding the codewords. However, if the signals identified as part of codeword demodulation are below a capacity ratio threshold, per codeword demodulation may not produce accurate results. The described techniques may provide for reporting of a per codeword capacity ratio metric to control whether to use per codeword demodulation.

A method for wireless communications by a user equipment (UE) is described. The method may include transmitting a first report indicating a capability to support per codeword demodulation for a set of multiple codewords, a second type of demodulation for the set of multiple codewords, or both, receiving, based on transmitting the first report, the set of multiple codewords over a set of multiple spatial streams in accordance with the per codeword demodulation or the second type of demodulation, and transmitting a second report indicating a capacity ratio metric for each codeword of the set of multiple codewords based on receiving the set of multiple codewords over the set of multiple spatial streams in accordance with the per codeword demodulation or the second type of demodulation.

A UE for wireless communications is described. The UE may include one or more memories storing processor executable code, and one or more processors coupled with the one or more memories. The one or more processors may individually or collectively operable to execute the code to cause the UE to transmit a first report indicating a capability to support per codeword demodulation for a set of multiple codewords, a second type of demodulation for the set of multiple codewords, or both, receive, based on transmitting the first report, the set of multiple codewords over a set of multiple spatial streams in accordance with the per codeword demodulation or the second type of demodulation, and transmit a second report indicating a capacity ratio metric for each codeword of the set of multiple codewords based on receiving the set of multiple codewords over the set of multiple spatial streams in accordance with the per codeword demodulation or the second type of demodulation.

Another UE for wireless communications is described. The UE may include means for transmitting a first report indicating a capability to support per codeword demodulation for a set of multiple codewords, a second type of demodulation for the set of multiple codewords, or both, means for receiving, based on transmitting the first report, the set of multiple codewords over a set of multiple spatial streams in accordance with the per codeword demodulation or the second type of demodulation, and means for transmitting a second report indicating a capacity ratio metric for each codeword of the set of multiple codewords based on receiving the set of multiple codewords over the set of multiple spatial streams in accordance with the per codeword demodulation or the second type of demodulation.

A non-transitory computer-readable medium storing code for wireless communications is described. The code may include instructions executable by a processor to transmit a first report indicating a capability to support per codeword demodulation for a set of multiple codewords, a second type of demodulation for the set of multiple codewords, or both, receive, based on transmitting the first report, the set of multiple codewords over a set of multiple spatial streams in accordance with the per codeword demodulation or the second type of demodulation, and transmit a second report indicating a capacity ratio metric for each codeword of the set of multiple codewords based on receiving the set of multiple codewords over the set of multiple spatial streams in accordance with the per codeword demodulation or the second type of demodulation.

Some examples of the method, user equipment (UEs), and non-transitory computer-readable medium described herein may further include operations, features, means, or instructions for receiving an indication of one or more downlink parameters based on transmitting the second report and receiving a codeword in accordance with the one or more downlink parameters.

In some examples of the method, user equipment (UEs), and non-transitory computer-readable medium described herein, the one or more downlink parameters include a modulation and coding scheme, a rank, a parameter associated with precoding, or any combination thereof.

Some examples of the method, user equipment (UEs), and non-transitory computer-readable medium described herein may further include operations, features, means, or instructions for transmitting a channel state information report, where the channel state information report includes the second report.

Some examples of the method, user equipment (UEs), and non-transitory computer-readable medium described herein may further include operations, features, means, or instructions for transmitting a channel state information report associated with the set of multiple codewords, where the second report may be transmitted in uplink control information that differs from the channel state information report.

Some examples of the method, user equipment (UEs), and non-transitory computer-readable medium described herein may further include operations, features, means, or instructions for receiving, after transmitting the second report, a second set of multiple codewords in accordance with the second type of demodulation, where the set of multiple codewords may be received in accordance with the per codeword demodulation.

Some examples of the method, user equipment (UEs), and non-transitory computer-readable medium described herein may further include operations, features, means, or instructions for performing radio resource control connection establishment after transmitting the first report.

In some examples of the method, user equipment (UEs), and non-transitory computer-readable medium described herein, the second report includes a first set of multiple bits that indicates a first capacity ratio metric for a first codeword of the set of multiple codewords and a second set of multiple bits that indicates a second capacity ratio metric for a second codeword of the set of multiple codewords.

In some examples of the method, user equipment (UEs), and non-transitory computer-readable medium described herein, the second report may be transmitted based on a rank associated with the set of multiple codewords being greater than a threshold.

In some examples of the method, user equipment (UEs), and non-transitory computer-readable medium described herein, the second type of demodulation includes full rank demodulation.

A method for wireless communications by a network entity is described. The method may include receiving a first report indicating a capability to support a first type of demodulation for a set of multiple codewords, a second type of demodulation for the set of multiple codewords, or both, transmitting the set of multiple codewords over a set of multiple spatial streams based on receiving the first report, and receiving a second report indicating a capacity ratio metric for each codeword of the set of multiple codewords based on transmitting the set of multiple codewords over the set of multiple spatial streams.

A network entity for wireless communications is described. The network entity may include one or more memories storing processor executable code, and one or more processors coupled with the one or more memories. The one or more processors may individually or collectively operable to execute the code to cause the network entity to receive a first report indicating a capability to support a first type of demodulation for a set of multiple codewords, a second type of demodulation for the set of multiple codewords, or both, transmit the set of multiple codewords over a set of multiple spatial streams based on receiving the first report, and receive a second report indicating a capacity ratio metric for each codeword of the set of multiple codewords based on transmitting the set of multiple codewords over the set of multiple spatial streams.

Another network entity for wireless communications is described. The network entity may include means for receiving a first report indicating a capability to support a first type of demodulation for a set of multiple codewords, a second type of demodulation for the set of multiple codewords, or both, means for transmitting the set of multiple codewords over a set of multiple spatial streams based on receiving the first report, and means for receiving a second report indicating a capacity ratio metric for each codeword of the set of multiple codewords based on transmitting the set of multiple codewords over the set of multiple spatial streams.

A non-transitory computer-readable medium storing code for wireless communications is described. The code may include instructions executable by a processor to receive a first report indicating a capability to support a first type of demodulation for a set of multiple codewords, a second type of demodulation for the set of multiple codewords, or both, transmit the set of multiple codewords over a set of multiple spatial streams based on receiving the first report, and receive a second report indicating a capacity ratio metric for each codeword of the set of multiple codewords based on transmitting the set of multiple codewords over the set of multiple spatial streams.

Some examples of the method, network entities, and non-transitory computer-readable medium described herein may further include operations, features, means, or instructions for transmitting an indication of one or more downlink parameters based on receiving the second report and transmitting a codeword in accordance with the one or more downlink parameters based on transmitting the indication of the one or more downlink parameters.

In some examples of the method, network entities, and non-transitory computer-readable medium described herein, the one or more downlink parameters include a modulation and coding scheme, a rank, a parameter associated with precoding, or any combination thereof.

Some examples of the method, network entities, and non-transitory computer-readable medium described herein may further include operations, features, means, or instructions for receiving a channel state information report, where the channel state information report includes the second report.

Some examples of the method, network entities, and non-transitory computer-readable medium described herein may further include operations, features, means, or instructions for receiving a channel state information report associated with the set of multiple codewords, where the second report may be received in uplink control information that differs from the channel state information report.

Some examples of the method, network entities, and non-transitory computer-readable medium described herein may further include operations, features, means, or instructions for performing radio resource control connection establishment after receiving the first report.

In some examples of the method, network entities, and non-transitory computer-readable medium described herein, the second report includes a first set of multiple bits that indicates a first capacity ratio metric for a first codeword of the set of multiple codewords and a second set of multiple bits that indicates a second capacity ratio metric for a second codeword of the set of multiple codewords.

In some examples of the method, network entities, and non-transitory computer-readable medium described herein, the second report may be received based on a rank associated with the set of multiple codewords being greater than a threshold.

In some examples of the method, network entities, and non-transitory computer-readable medium described herein, the second type of demodulation includes full rank demodulation.

DETAILED DESCRIPTION

A user equipment (UE) may receive multiple codewords from a network entity over a set of spatial streams. To demodulate the multiple codewords, the UE may perform per codeword demodulation or full rank demodulation. Performing per codeword demodulation may include identifying a separate signal associated with each codeword of the multiple codewords, whereas full rank demodulation may include identifying a single signal for multiple codewords. In some examples, performing per codeword demodulation may enable an overall decreased complexity associated with processing codewords. However, as a codeword capacity ratio metric associated with per codeword demodulation decreases, a loss in throughput associated with per codeword demodulation may increase due to a corresponding increase in a decoding error rate when applying per codeword demodulation. Techniques that enable decreased processing complexity while limiting losses in throughput may increase the efficiency of wireless communications.

For instance, a UE may transmit, to a network entity, a first report indicating a capability to support per codeword demodulation for a set of codewords, full rank demodulation for the set of codewords, or both. The UE may receive, from the network entity, the set of codewords over a set of spatial streams in accordance with per codeword demodulation or full rank demodulation and may transmit, to the network entity, a second report indicating a capacity ratio metric for each codeword of the set of codewords. Providing the second report may enable the network entity to detect whether a loss in throughput is associated with any of the set of codewords and may enable the network entity to perform techniques to mitigate the loss in throughput.

After receiving the second report, the network entity may adjust one or more downlink parameters (e.g., a modulation and coding scheme (MCS), a rank, a precoding parameter) and may provide an indication of those parameters to the UE. Using the adjusted parameters may effectively increase the capacity ratio metric and may thus improve throughput while enabling the UE to continue using per codeword demodulation. Additionally, using the adjusted parameters may enable an increased capacity and/or coverage of a specific UE or of an entire cell (e.g., a cell that includes the network entity and the UE).

Aspects of the disclosure are initially described in the context of wireless communications systems. Additional aspects of the disclosure may be described in the context of a process flow. Aspects of the disclosure are further illustrated by and described with reference to apparatus diagrams, system diagrams, and flowcharts that relate to reporting a per codeword capacity ratio metric for improved wireless communications.

Figure 1:
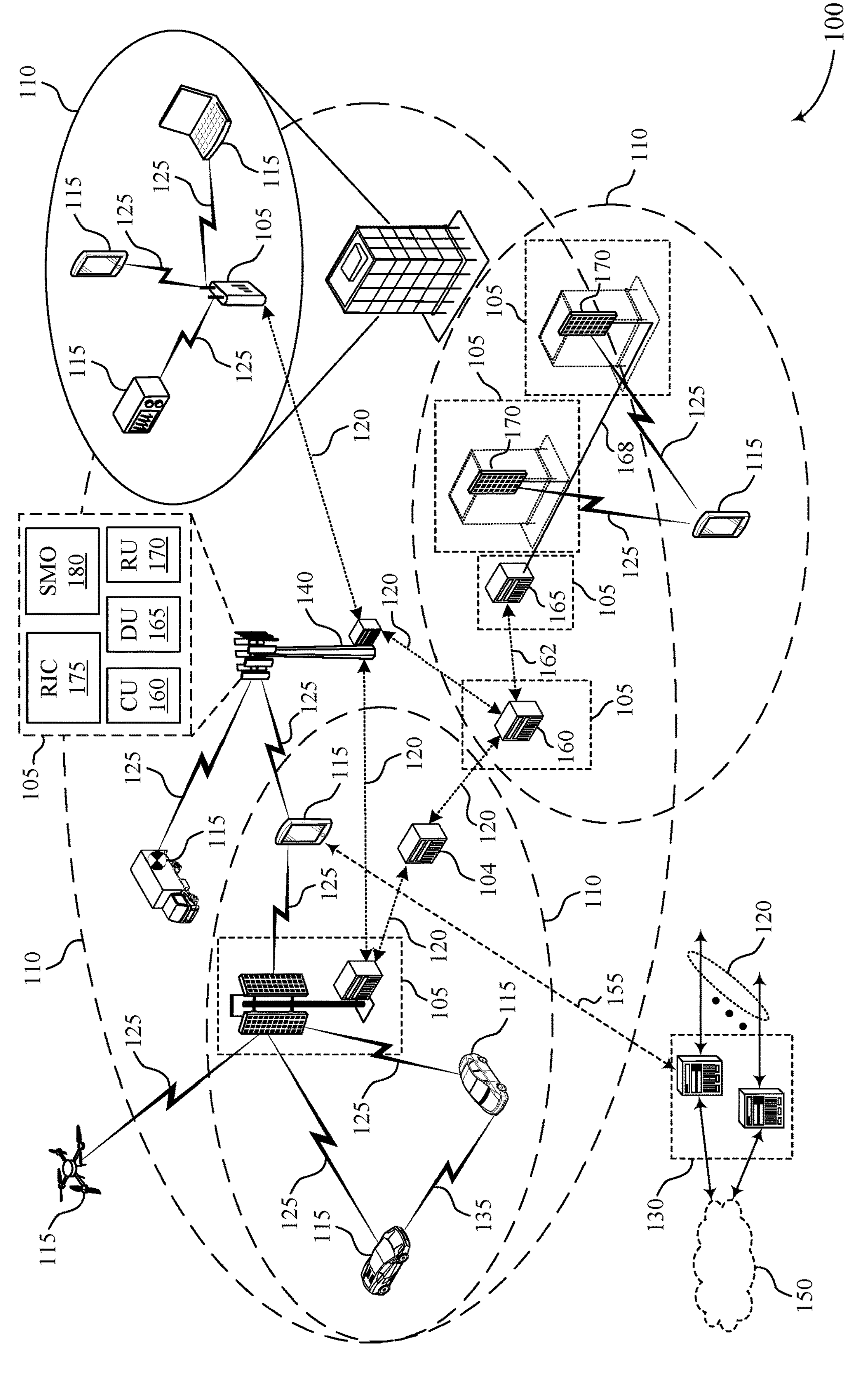
FIG. 1 shows an example of a wireless communications system that supports reporting a per codeword capacity ratio metric for improved wireless communications in accordance with one or more aspects of the present disclosure.

FIG. 1 shows an example of a wireless communications system 100 that supports reporting a per codeword capacity ratio metric for improved wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reporting a per codeword capacity ratio metric for improved wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a network entity 105, a UE 115) along a single beam direction (e.g., a direction associated with the receiving device, such as a network entity 105 or a UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive multiple codewords from a network entity 105 over a set of spatial streams. To demodulate, the UE 115 may perform per codeword demodulation or full rank demodulation. Performing per codeword demodulation may include identifying a separate signal associated with each codeword of the multiple codewords as part of demodulation, whereas full rank demodulation may include identifying a single signal for multiple codewords as part of demodulation. In some examples, performing per codeword demodulation may enable an overall decreased complexity associated with processing codewords. However, as a codeword capacity ratio metric associated with per codeword demodulation decreases, a loss in throughput associated with per codeword demodulation may increase. Techniques that enable decreased processing complexity while limiting losses in throughput may increase the efficiency of wireless communications.

For instance, a UE 115 may transmit, to a network entity 105, a first report indicating a capability to support per codeword demodulation for a set of codewords, full rank demodulation for the set of codewords, or both. The UE 115 may receive, from the network entity 105, the set of codewords over a set of spatial streams in accordance with per codeword demodulation or full rank demodulation and may transmit, to the network entity 105 a second report indicating a capacity ratio metric for each codeword of the set of codewords. After receiving the second report, the network entity 105 may adjust one or more downlink parameters (e.g., a modulation and coding scheme (MCS), a rank, a precoding parameter) and may provide an indication of those parameters to the UE 115. Using the adjusted parameters may effectively increase the capacity ratio metric and may thus improve throughput while enabling the UE 115 to continue using per codeword demodulation.

Figure 2:
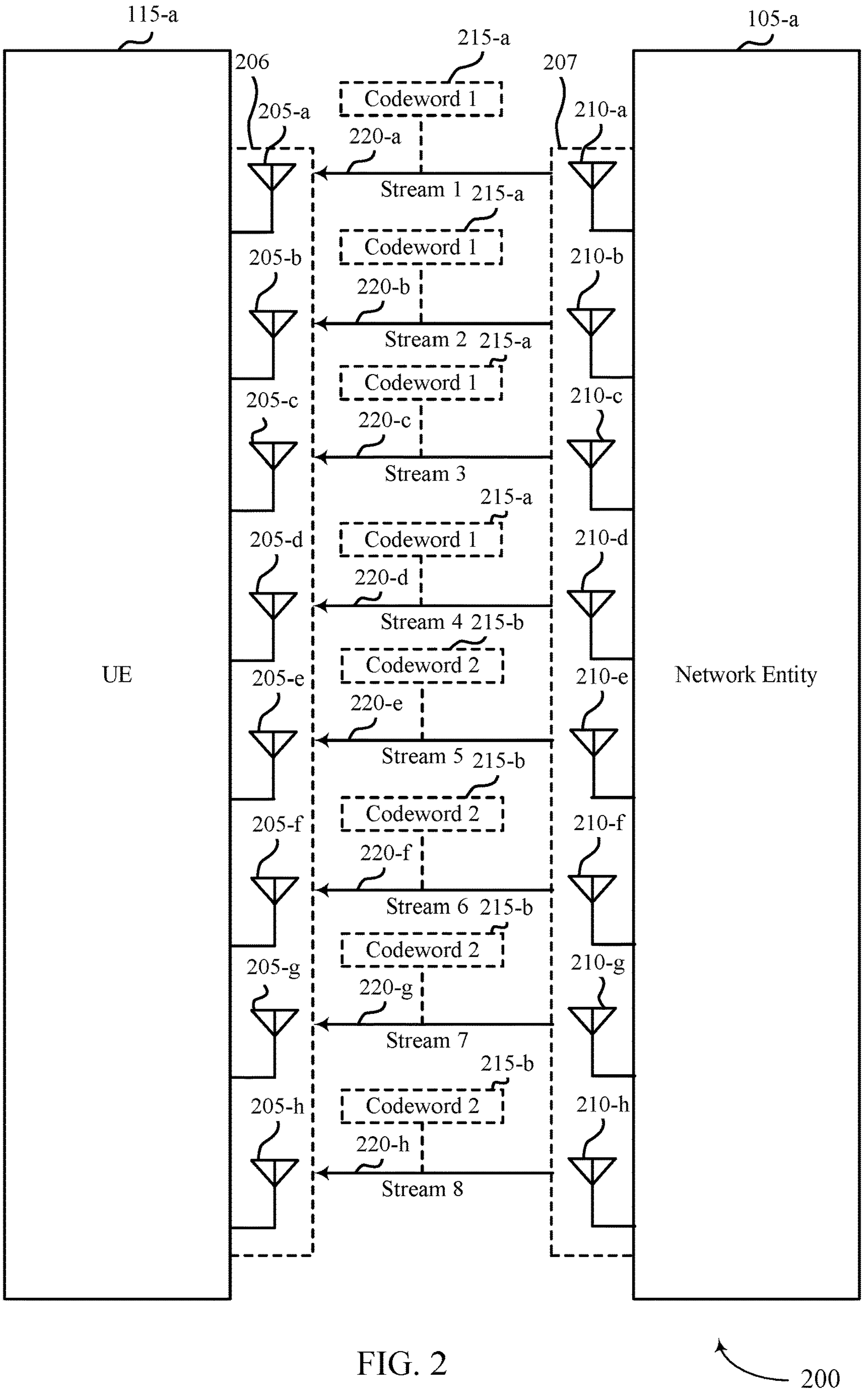
FIG. 2 shows an example of a wireless communications system that supports reporting a per codeword capacity ratio metric for improved wireless communications in accordance with one or more aspects of the present disclosure.

FIG. 2 shows an example of a wireless communications system 200 that supports reporting a per codeword capacity ratio metric for improved wireless communications in accordance with one or more aspects of the present disclosure. In some examples, wireless communications system 200 may implement one or more aspects of FIG. 1. For instance, UE 115-*a* may be an example of a UE 115 as described with reference to FIG. 1 and/or network entity 105-*a* may be an example of a network entity 105 as described with reference to FIG. 1.

As illustrated herein, UE 115-*a* may transmit a capability report to network entity 105-*a*. Using the capability report, UE 115-*a* may declare, prior to RRC connection establishment, that it supports only per codeword demodulation, only full rank demodulation, or both per codeword demodulation and full rank demodulation.

After receiving the capability report, network entity 105-*a* may transmit a set of codewords over a set of spatial streams, where each spatial stream is transmitted over a set of transmit antennas 207 using precoding. For instance, network entity 105-*a* may have a set of transmit antennas 207 that includes first transmit antenna 210-*a*, a second transmit antenna 210-*b*, a third transmit antenna 210-*c*, a fourth transmit antenna 210-*d*, a fifth transmit antenna 210-*e*, a sixth transmit antenna 210-*f*, a seventh transmit antenna 210-*g*, and an eighth transmit antenna 210-*h*. Network entity 105-*a* may transmit a first codeword 215-*a* via a first group of spatial streams (e.g., first spatial stream 220-*a*, second spatial stream 220-*b*, third spatial stream 220-*c*, and fourth spatial stream 220-*d*) from the set of transmit antennas 207 and may transmit a second codeword 215-*b* via a second group of spatial streams (e.g., fifth spatial stream 220-*e*, sixth spatial stream 220-*f*, seventh spatial stream 220-*g*, and eighth spatial stream 220-*h*) from the set of transmit antennas 207. In some examples, each group of spatial streams (e.g., each codeword group) may be used to transmit a respective codeword with a respective MCS and/or a respective code block length. For instance, spatial streams 220-*a* through 220-*d* may send the first codeword with a first MCS and/or a first code block length and spatial streams 220-*e* through 220-*g* may send the second codeword with a second MCS and/or second code block length. In some examples, each of spatial streams 220-*a* through 220-*g* may each be sent from all transmit antennas in the set of transmit antennas 207.

In the present example, network entity 105-*a* may utilize eight spatial streams (e.g., spatial streams 220-*a* through 220-*h*), which may correspond to a rank of value 8. However, it should be noted that a different quantity of spatial streams may be employed without deviating from the present disclosure. In some examples, transmit antennas 210-*a* through 210-*h* may each include a respective antenna element or a respective set of antenna elements.

UE 115-*a* may receive the set of codewords over the set of spatial streams using the set of receive antennas 206. For instance, the set of receive antennas 206 may include a first receive antenna 205-*a*, a second receive antenna 205-*b*, a third receive antenna 205-*c*, a fourth receive antenna 205-*d*, a fifth receive antenna 205-*c*, a sixth receive antenna 205-*f*, a seventh receive antenna 205-*g*, and an eighth receive antenna 205-*h* that UE 115-*a* uses to receive first codeword 215-*a* and second codeword 215-*b*. In some examples, each receive antenna of the set of receive antennas 206 may be used to receive the transmitted signal associated with the set of spatial streams (e.g., each stream may be received by all of the receive antennas in the set of receive antennas 206). At the process of demodulation, UE 115-*a* may separate the received signal to different streams and associate these streams to different codewords. In some examples, a quantity of spatial streams used for transmission or reception of a set of codewords may be correspond to the rank of the transmission. In some examples, receive antennas 205-*a* through 205-*h* may each include a respective antenna element or a respective set of antenna elements.

Upon receiving first codeword 215-*a* and second codeword 215-*b*, UE 115-*a* may determine a first capacity ratio metric value for first codeword 215-*a* and a second capacity ratio metric value for second codeword 215-*b*. UE 115-*a* may transmit a capacity ratio report (e.g., a per codeword capacity ratio report) to network entity 105-*a* that includes the capacity ratio metric values for first codeword 215-*a* and second codeword 215-*b*. In some examples, the capacity ratio report may be based on a received channel and noise covariance. Network entity 105-*a* may process information within the capacity ratio report to adjust downlink parameters, which may include MCS, rank, or a precoding parameter (e.g., a precoding matrix indicator). Upon adjusting the downlink parameters, network entity 105-*a* may transmit an indication of the adjusted downlink parameters to UE 115-*a*. Network entity 105-*a* may transmit one or more subsequent codeword transmissions via a set of spatial streams in accordance with the downlink parameters. UE 115-*a* may receive the subsequent codeword transmissions via a set of spatial streams in accordance with the downlink parameters.

Figure 3:
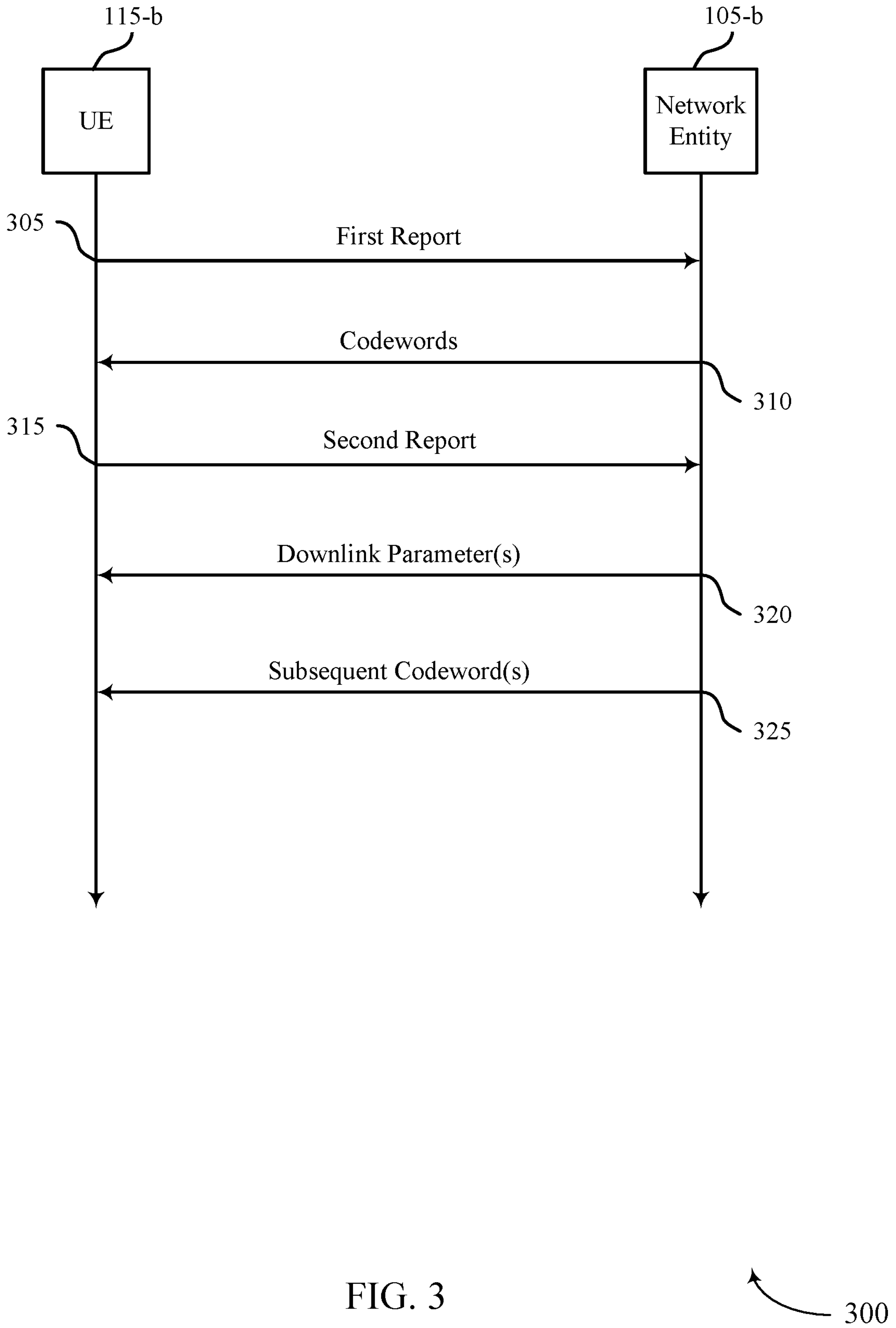
FIG. 3 shows an example of a process flow that supports reporting a per codeword capacity ratio metric for improved wireless communications in accordance with one or more aspects of the present disclosure.

FIG. 3 shows an example of a process flow 300 that supports reporting a per codeword capacity ratio metric for improved wireless communications in accordance with one or more aspects of the present disclosure. In some examples, process flow 300 may implement one or more aspects of FIGS. 1 and/or 2. For instance, UE 115-*b* may be an example of a UE 115 as described with reference to FIG. 1 and/or a UE 115-*a* as described with reference to FIG. 2. Additionally, or alternatively, network entity 105-*b* may be an example of a network entity 105 as described with reference to FIG. 1 and/or a network entity 105-*a* as described with reference to FIG. 2.

In some examples, UE 115-*b* may communicate with network entity 105-*b*. For instance, network entity 105-*b* may transmit a downlink transmission to UE 115-*b*. When the downlink transmission has a quantity of spatial streams above a threshold amount (e.g., 5-8 spatial streams that exceeds a threshold quantity of 4 spatial streams), the downlink transmission may be split into two codewords. The present disclosure recites techniques that may improve an accuracy of downlink parameters set by network entity 105-*b*. For instance, the techniques may involve UE 115-*b* providing a report of a capacity ratio metric per codeword (e.g., the metric is in a range of [0, 1]) that indicates (e.g., reflects) a capacity ratio between per codeword demodulation and full rank demodulation. As the capacity ratio metric approaches 1, the channel may more closely resemble a block diagonal, where each codeword represents a block. The capacity ratio metric may be provided as side information to a channel state information (CSI) report provided by UE 115-*b*.

To illustrate the techniques described herein, at 305, UE 115-*b* may transmit a first report (e.g., a capability report) indicating a capability to support per codeword demodulation for a set of codewords, a second type of demodulation (e.g., full rank demodulation) for the set of codewords, or both. Using the first report, UE 115-*b* may declare, prior to RRC connection establishment, that it supports only per codeword demodulation, only full rank demodulation, or both per codeword demodulation and full rank demodulation. If UE 115-*b* supports both per codeword demodulation and full rank demodulation, UE 115-*b* may dynamically switch between them. Network entity 105-*b* may receive the first report. In some examples, UE 115-*b* and/or network entity 105-*b* may perform RRC connection establishment after communicating the first report.

At 310, network entity 105-*b* may transmit a set of codewords over a set of spatial streams based on receiving the first report. UE 115-*b* may receive the set of codewords over the set of spatial streams in accordance with the per codeword demodulation or the second type of demodulation.

In some examples, a first and second codeword of the set of codewords may be provided in a signal. In such examples, the received two codeword signal may be modeled as $$\vec{y} = H\vec{x} + \vec{v} = \begin{bmatrix} H_1 & H_2 \end{bmatrix} \begin{bmatrix} \vec{x}_1 \\ \vec{x}_2 \end{bmatrix} + \vec{v},$$

where $H_i$ may be a channel matrix of a codeword i and where $\vec{x}_i$ may be a transmitted symbol vector of codeword i. In the present example, $\vec{v}$ may correspond to whitened noise or may correspond to non-white noise. To perform per codeword demodulation and separate processor to per codeword independent processing, UE 115-*b* may apply a linear transformation on the received signal. For instance, $$\tilde{\vec{y}} = K\vec{y} = \begin{bmatrix} \tilde{\vec{y}}_1 \\ \tilde{\vec{y}}_2 \end{bmatrix} = \begin{bmatrix} K_1 \\ K_2 \end{bmatrix} [H_1 \quad H_2] \begin{bmatrix} \vec{x}_1 \\ \vec{x}_2 \end{bmatrix} + \begin{bmatrix} K_1 \\ K_2 \end{bmatrix} \vec{v} = \begin{bmatrix} K_1H_1 & K_1H_2 \\ K_2H_1 & K_2H_2 \end{bmatrix} \begin{bmatrix} \vec{x}_1 \\ \vec{x}_2 \end{bmatrix} + \begin{bmatrix} \tilde{\vec{v}}_1 \\ \tilde{\vec{v}}_2 \end{bmatrix} = \begin{bmatrix} \tilde{H}_{11} & \tilde{H}_{12} \\ \tilde{H}_{21} & \tilde{H}_{22} \end{bmatrix} \begin{bmatrix} \vec{x}_1 \\ \vec{x}_2 \end{bmatrix} + \begin{bmatrix} \tilde{\vec{v}}_1 \\ \tilde{\vec{v}}_2 \end{bmatrix}.$$

In such examples, the per codeword processing of codeword i may be represented as $\tilde{\vec{y}}_i = \tilde{H}_{ii}\vec{x}_i + \tilde{\vec{v}}_i$. In the present example, full rank demodulation may result in $\vec{y}$ and per codeword demodulation may result in $\tilde{\vec{y}}$.

In some examples, a capacity ratio metric (e.g., a per codeword capacity ratio metric) may be determined as $$c_i = \frac{\log\left|I + \tilde{H}_{ii}^H \tilde{H}_{ii}\right|}{\log\left|I + \tilde{H}_i^H \tilde{H}_i\right|}, \tilde{H}_i = \begin{bmatrix} \tilde{H}_{1i} \\ \tilde{H}_{2i} \end{bmatrix},$$

where $0 \le c_i \le 1$ (e.g., according to the Hadamard inequality). Whenever $c_i$ is close to 1 (e.g., within a threshold range of 1), UE 115-*b* may determine that loss in throughput associated with per codeword demodulation for codeword i of the set of codewords is below a threshold amount with respect to full rank demodulation.

At 315, UE 115-*b* may transmit a second report (e.g., a capacity ratio report, a per codeword capacity ratio report) indicating a capacity ratio metric for each codeword of the set of codewords based on receiving the set of codewords over the set of spatial streams in accordance with the per codeword demodulation or the second type of demodulation. In some examples, UE 115-*b* may provide the second report if UE 115-*b* supports only per codeword demodulation or both per codeword demodulation and full rank demodulation (e.g., indicated in the first report at 305). In some examples, the second report may be sent only for rank above a predefined amount (e.g., a rank greater than 4). In some examples, UE 115-*b* may piggyback the second report over a CSI report (e.g., multiplex the second report with the CSI report). The second report may be a CSI report with an additional field that includes a capacity ratio metric per codeword. Alternatively, or additionally, an uplink control information (UCI) report, separate from a CSI report, may be configured to enable the UE 115-*b* to indicate the capacity ratio metric per codeword. The UCI report may have some granularity that is different from or the same as the granularity of the CSI report. In some examples, the second report may have a predefined quantity of bits per codeword (e.g., 4 bits) representing values from 0 to 1 for reporting the capacity ratio metric per codeword. For instance, 0000 may represent a 0 value for the capacity ratio metric of a particular codeword, 0001 may represent a 1/16 value for the capacity ratio metric of a particular codeword, and so on up to 1111, which may represent a 15/16 value for the capacity ratio metric of a particular codeword. In some examples, reporting the capacity ratio metric may indicate how close per codeword demodulation is to an optimal full rank demodulation (e.g., where the capacity ratio metric $c_i$ is at or near 1). In some examples, the second report may be based on a received channel and noise covariance. Network entity 105-*b* may receive the second report.

At 320, network entity 105-*b* may transmit a control message indicating one or more downlink parameters to UE 115-*b* based on receiving the second report. UE 115-*b* may receive the control message indicating the one or more parameters. Network entity 105-*b* may process information within the second report to adjust the downlink parameters, which may include MCS, rank, or a precoding parameter (e.g., a precoding matrix indicator). In some examples, network entity 105-*b* may schedule subsequent codeword transmissions to be transmitted via a quantity of spatial streams equal to a value of the rank after adjusting, or determining to maintain, the one or more parameters. The network entity 105-*b* may use the downlink parameters (e.g., the MCS, rank, or precoding parameter), with or without adjustment, to communicate the subsequent codeword transmissions with UE 115-*b*. In some examples, network entity 105-*b* may indicate to UE 115-*b* which type of demodulation (e.g., full rank demodulation or per codeword demodulation) to use (e.g., via the control message) for demodulating the subsequent codeword transmissions. Alternatively, UE 115-*b* may select which type of demodulation (e.g., full rank demodulation or per codeword demodulation) to use for demodulating the subsequent codeword transmissions based on the control message, the determined capacity ratio metric, or both.

At 325, network entity 105-*b* may transmit subsequent codeword transmissions in accordance with the one or more downlink parameters indicated in the control message. For instance, network entity 105-*b* may transmit subsequent codeword transmissions over a quantity of spatial streams equal to the value of the rank in accordance with any adjustments to the one or more downlink parameters. UE 115-*b* may receive the subsequent codeword transmissions via the one or more spatial streams in accordance with the one or more downlink parameters. For instance, UE 115-*b* may select a type of demodulation (e.g., full rank demodulation or per codeword demodulation) to use for receiving the subsequent codeword transmissions based on the adjusted downlink parameters and which types of demodulation the wireless channel supports.

In another example, of using a capacity ratio metric, network entity 105-*b* may transmit the set of codewords (e.g., two codewords) over a quantity of spatial streams equal to a transmission rank. For instance, if the rank is equal to 8, network entity 105-*b* may transmit the set of codewords over 8 spatial streams. In such examples, network entity 105-*b* may transmit the set of codewords using 8 transmit antennas and UE 115-*b* may receive the set of codewords over 8 receive antennas, where an MCS associated with a first codeword and a second codeword of the set of codewords is 22. If UE 115-*b* measures a capacity ratio metric of 0.99 over the first and second codewords and reports the capacity ratio metric of 0.99 to network entity 105-*b*, network entity 105-*b* may increase the MCS used for transmitting each of the first and second codewords (e.g., due to the capacity ratio metric being close to 1). The capacity ratio metric being close to 1 may indicate that the wireless channel supports a higher MCS than that used for transmitting the set of codewords. Thus, network entity 105-*b* may adjust the MCS to a higher value, which may result in a greater data throughput via the wireless channel.

In yet another example of using a capacity ratio metric, the rank may be 8 and network entity 105-*b* may transmit the set of codewords (e.g., two codewords) over 8 spatial streams. In such examples, network entity 105-*b* may transmit the set of codewords using 8 transmit antennas and UE 115-*b* may receive the set of codewords over 8 receive antennas where an MCS value associated with a first codeword and a second codeword of the set of codewords is 27. If UE 115-*b* measures a capacity ratio metric of 0.99 for the first codeword and a capacity ratio metric of 0.8 for the second codeword, and reports the capacity ratio metric values to network entity 105-*b*, network entity 105-*b* may decrease the MCS over the second codeword, which may improve throughput. For instance, the capacity ratio metric being significantly below 1 (e.g., below a threshold amount) may indicate that the channel may not be accurately modeled as a block diagonal and that modeling the channel as the block diagonal may result in more than a threshold amount of decoding errors occurring, thus degrading channel throughput. In order to decrease decoding errors, the MCS may be decreased, which may result in an increased capacity ratio metric. Having fewer decoding errors may result in increased data throughput via the wireless channel, based on the current conditions of the wireless channel.

Figure 4:
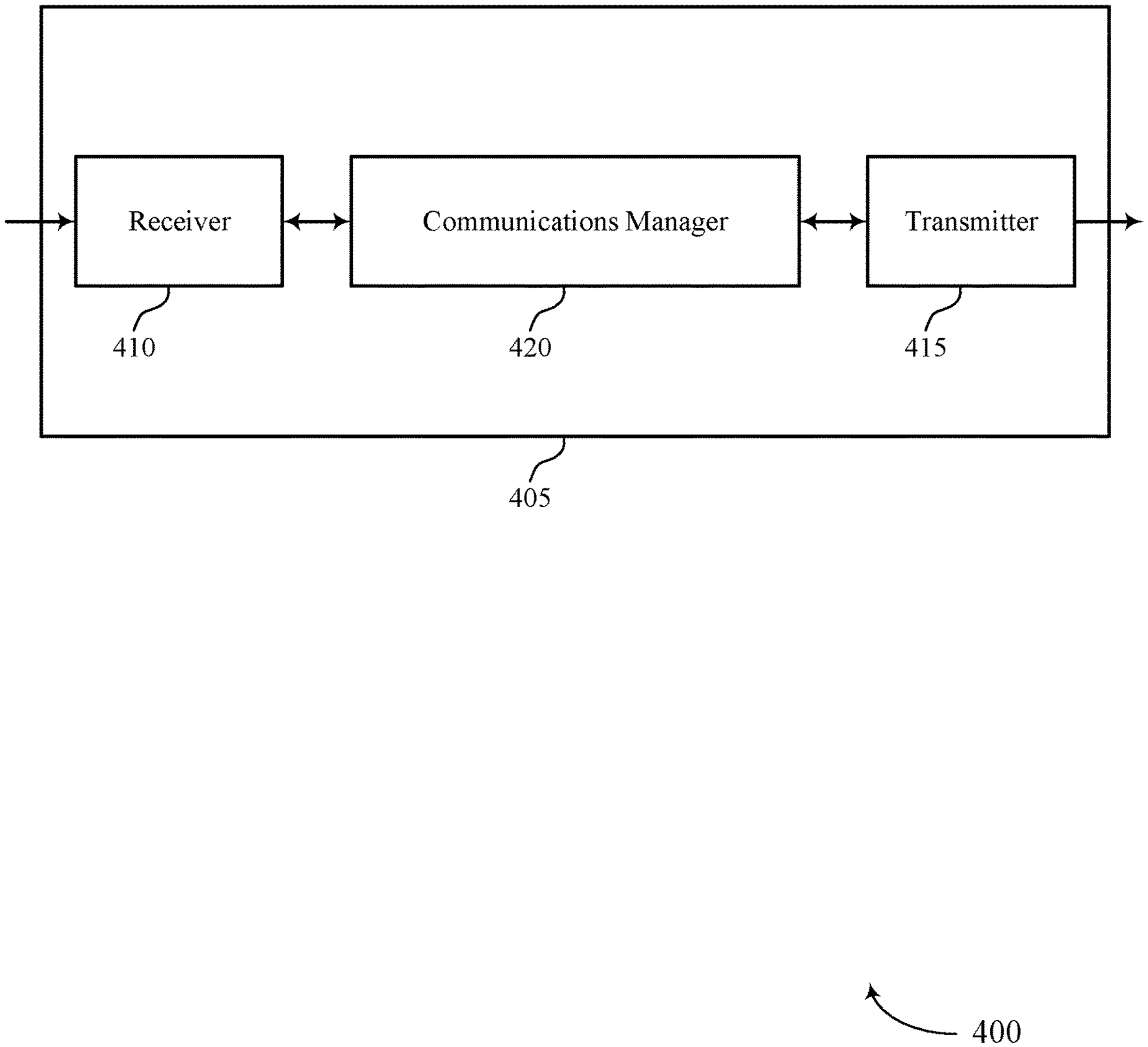
FIGS. 4 and 5 show block diagrams of devices that support reporting a per codeword capacity ratio metric for improved wireless communications in accordance with one or more aspects of the present disclosure.

FIG. 4 shows a block diagram 400 of a device 405 that supports reporting a per codeword capacity ratio metric for improved wireless communications in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to reporting a per codeword capacity ratio metric for improved wireless communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to reporting a per codeword capacity ratio metric for improved wireless communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of reporting a per codeword capacity ratio metric for improved wireless communications as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting a first report indicating a capability to support per codeword demodulation for a set of multiple codewords, a second type of demodulation for the set of multiple codewords, or both. The communications manager 420 is capable of, configured to, or operable to support a means for receiving, based on transmitting the first report, the set of multiple codewords over a set of multiple spatial streams in accordance with the per codeword demodulation or the second type of demodulation. The communications manager 420 is capable of, configured to, or operable to support a means for transmitting a second report indicating a capacity ratio metric for each codeword of the set of multiple codewords based on receiving the set of multiple codewords over the set of multiple spatial streams in accordance with the per codeword demodulation or the second type of demodulation.

By including or configuring the communications manager 420 in accordance with examples as described herein, the device 405 (e.g., at least one processor controlling or otherwise coupled with the receiver 410, the transmitter 415, the communications manager 420, or a combination thereof)

may support techniques for reporting of codeword capacity ratio metric values to enable reduced codeword processing complexity while limiting losses in throughput.

Figure 5:
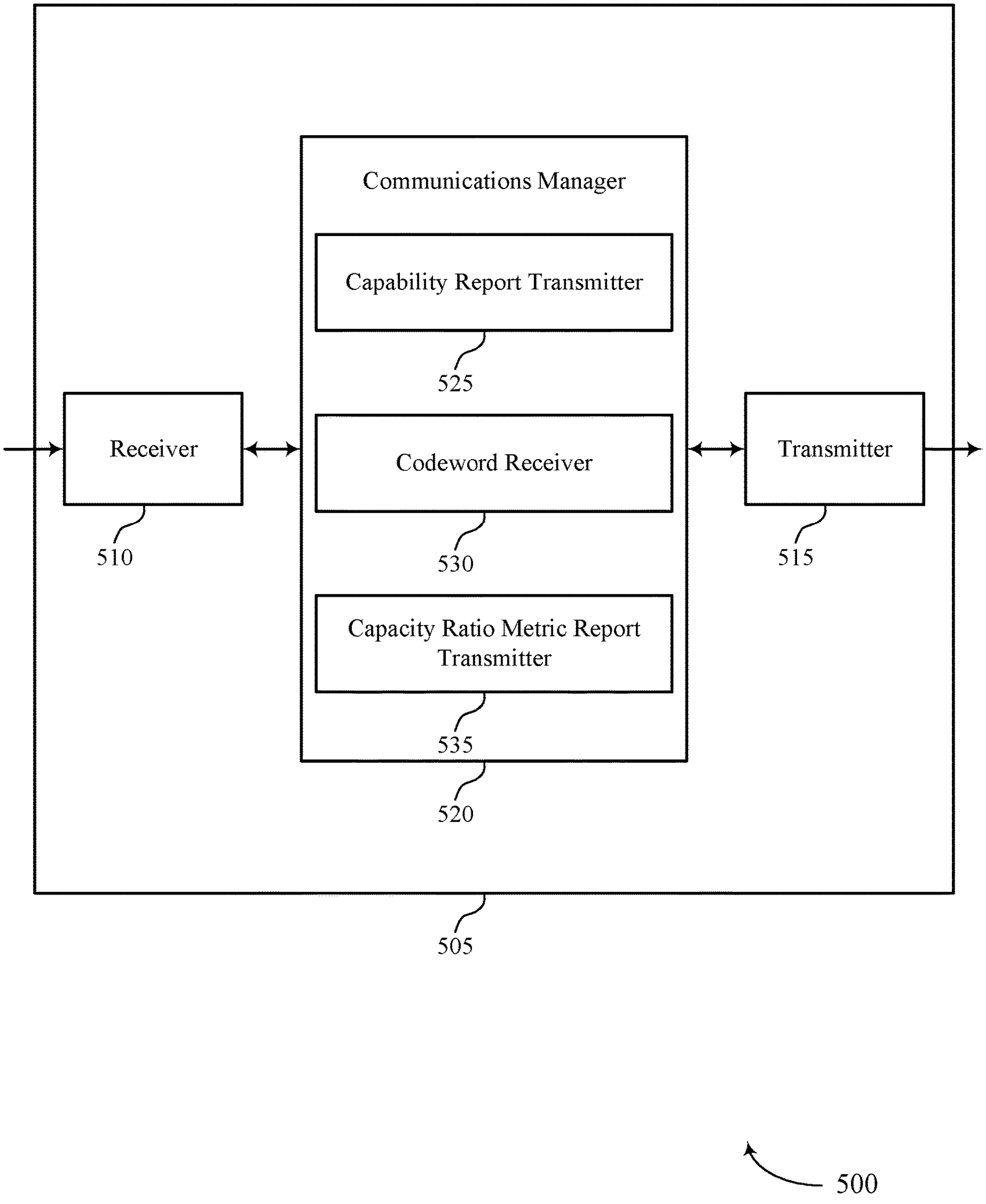

FIG. 5 shows a block diagram 500 of a device 505 that supports reporting a per codeword capacity ratio metric for improved wireless communications in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to reporting a per codeword capacity ratio metric for improved wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reporting a per codeword capacity ratio metric for improved wireless communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of reporting a per codeword capacity ratio metric for improved wireless communications as described herein. For example, the communications manager 520 may include a capability report transmitter 525, a codeword receiver 530, a capacity ratio metric report transmitter 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The capability report transmitter 525 is capable of, configured to, or operable to support a means for transmitting a first report indicating a capability to support per codeword demodulation for a set of multiple codewords, a second type of demodulation for the set of multiple codewords, or both. The codeword receiver 530 is capable of, configured to, or operable to support a means for receiving, based on transmitting the first report, the set of multiple codewords over a set of multiple spatial streams in accordance with the per codeword demodulation or the second type of demodulation. The capacity ratio metric report transmitter 535 is capable of, configured to, or operable to support a means for transmitting a second report indicating a capacity ratio metric for each codeword of the set of multiple codewords based on receiving the set of multiple codewords over the set of multiple spatial streams in accordance with the per codeword demodulation or the second type of demodulation.

Figure 6:
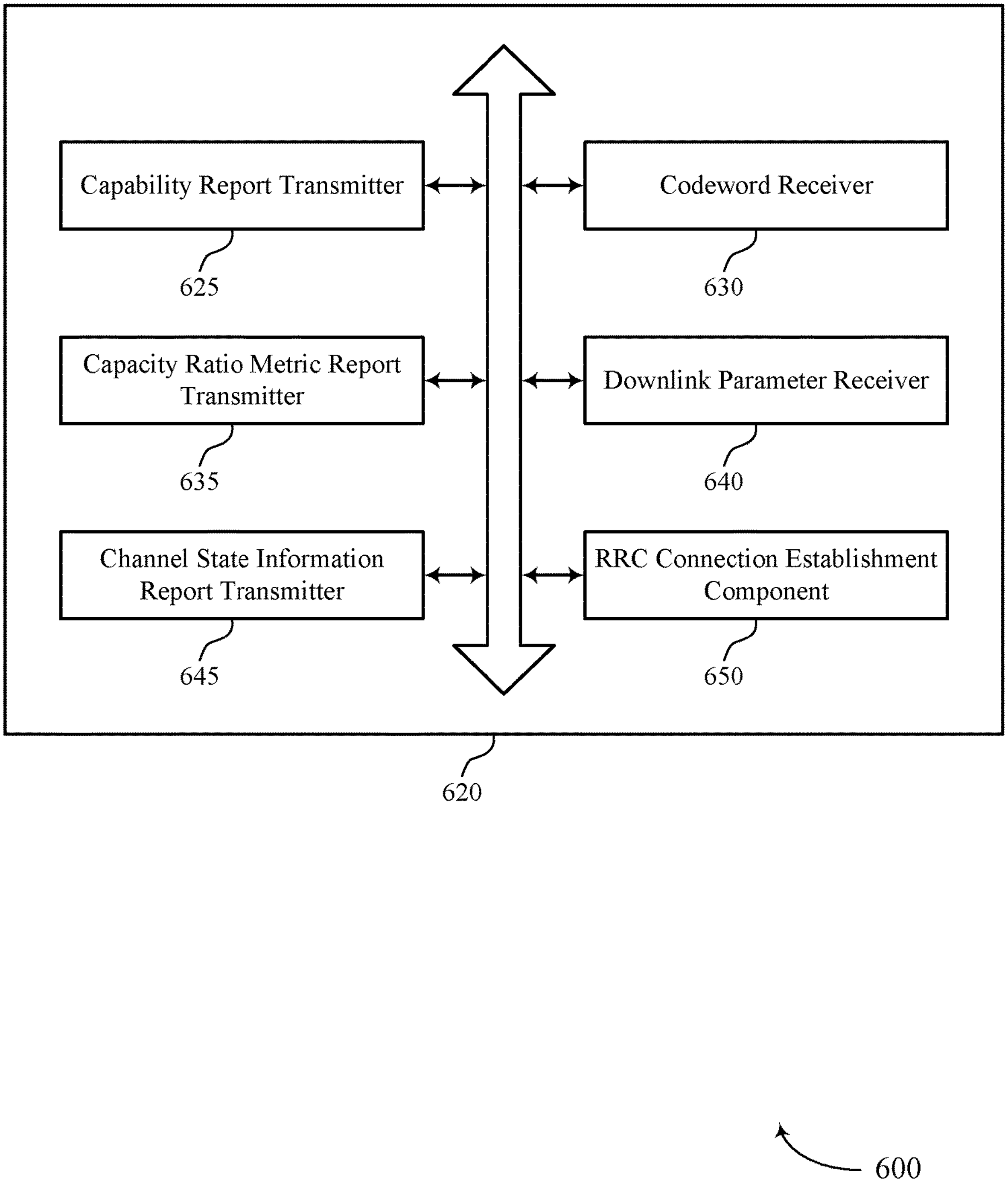
FIG. 6 shows a block diagram of a communications manager that supports reporting a per codeword capacity ratio metric for improved wireless communications in accordance with one or more aspects of the present disclosure.

FIG. 6 shows a block diagram 600 of a communications manager 620 that supports reporting a per codeword capacity ratio metric for improved wireless communications in accordance with one or more aspects of the present disclosure. The communications manager 620 may be an example of aspects of a communications manager 420, a communications manager 520, or both, as described herein. The communications manager 620, or various components thereof, may be an example of means for performing various aspects of reporting a per codeword capacity ratio metric for improved wireless communications as described herein. For example, the communications manager 620 may include a capability report transmitter 625, a codeword receiver 630, a capacity ratio metric report transmitter 635, a downlink parameter receiver 640, a channel state information report transmitter 645, an RRC connection establishment component 650, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The capability report transmitter 625 is capable of, configured to, or operable to support a means for transmitting a first report indicating a capability to support per codeword demodulation for a set of multiple codewords, a second type of demodulation for the set of multiple codewords, or both. The codeword receiver 630 is capable of, configured to, or operable to support a means for receiving, based on transmitting the first report, the set of multiple codewords over a set of multiple spatial streams in accordance with the per codeword demodulation or the second type of demodulation. The capacity ratio metric report transmitter 635 is capable of, configured to, or operable to support a means for transmitting a second report indicating a capacity ratio metric for each codeword of the set of multiple codewords based on receiving the set of multiple codewords over the set of multiple spatial streams in accordance with the per codeword demodulation or the second type of demodulation.

In some examples, the downlink parameter receiver 640 is capable of, configured to, or operable to support a means for receiving an indication of one or more downlink parameters based on transmitting the second report. In some examples, the codeword receiver 630 is capable of, configured to, or operable to support a means for receiving a codeword in accordance with the one or more downlink parameters.

In some examples, the one or more downlink parameters include a modulation and coding scheme, a rank, a parameter associated with precoding, or any combination thereof.

In some examples, the channel state information report transmitter 645 is capable of, configured to, or operable to support a means for transmitting a channel state information report, where the channel state information report includes the second report.

In some examples, the channel state information report transmitter 645 is capable of, configured to, or operable to support a means for transmitting a channel state information report associated with the set of multiple codewords, where the second report is transmitted in uplink control information that differs from the channel state information report.

In some examples, the codeword receiver 630 is capable of, configured to, or operable to support a means for receiving, after transmitting the second report, a second set of multiple codewords in accordance with the second type of demodulation, where the set of multiple codewords is received in accordance with the per codeword demodulation.

In some examples, the RRC connection establishment component 650 is capable of, configured to, or operable to support a means for performing radio resource control connection establishment after transmitting the first report.

In some examples, the second report includes a first set of multiple bits that indicates a first capacity ratio metric for a first codeword of the set of multiple codewords and a second set of multiple bits that indicates a second capacity ratio metric for a second codeword of the set of multiple codewords.

In some examples, the second report is transmitted based on a rank associated with the set of multiple codewords being greater than a threshold.

In some examples, the second type of demodulation includes full rank demodulation.

Figure 7:
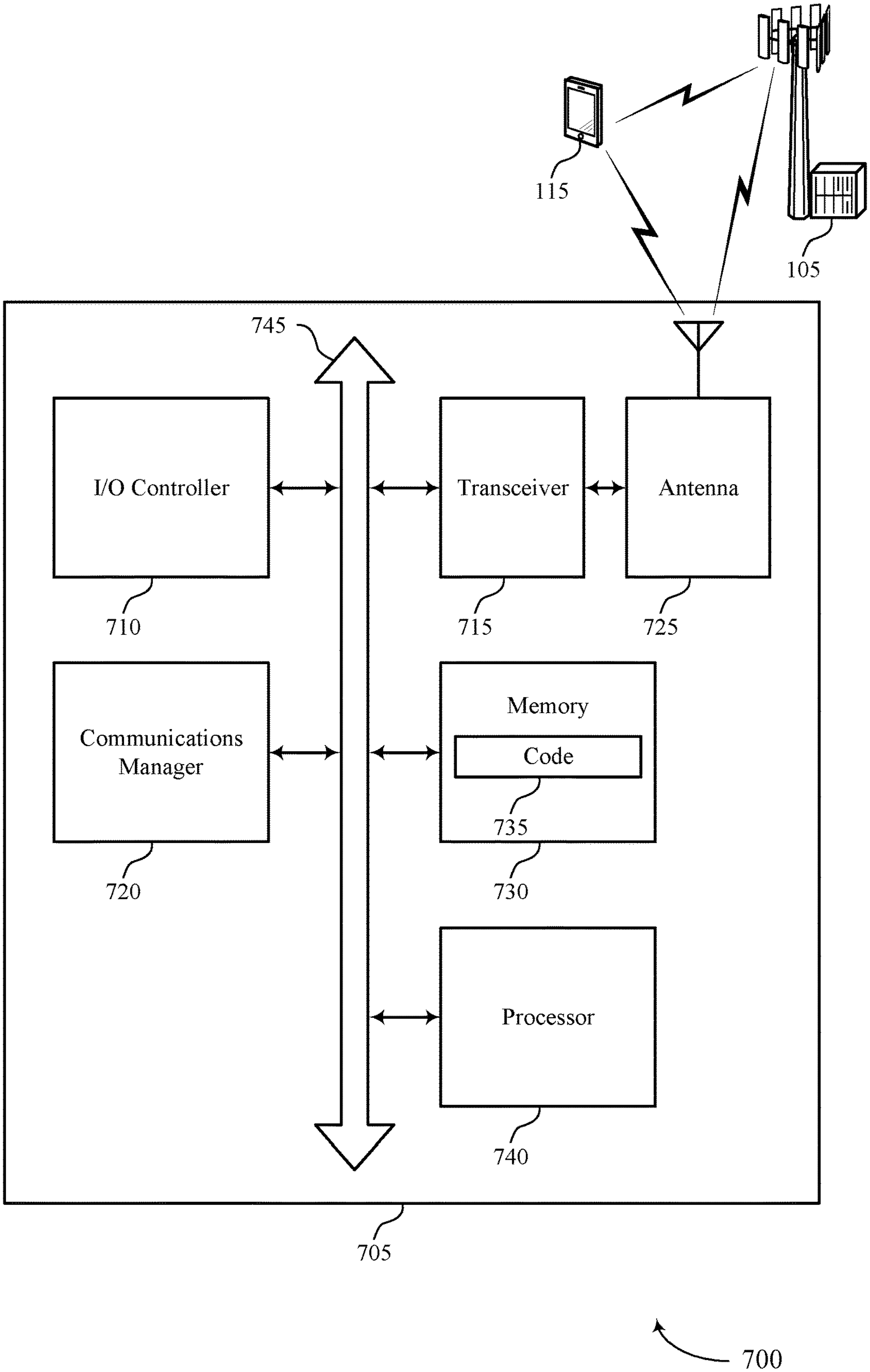
FIG. 7 shows a diagram of a system including a device that supports reporting a per codeword capacity ratio metric for improved wireless communications in accordance with one or more aspects of the present disclosure.

FIG. 7 shows a diagram of a system 700 including a device 705 that supports reporting a per codeword capacity ratio metric for improved wireless communications in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting reporting a per codeword capacity ratio metric for improved wireless communications). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for transmitting a first report indicating a capability to support per code word demodulation for a set of multiple codewords, a second type of demodulation for the set of multiple codewords, or both. The communications manager 720 is capable of, configured to, or operable to support a means for receiving, based on transmitting the first report, the set of multiple codewords over a set of multiple spatial streams in accordance with the per codeword demodulation or the second type of demodulation. The communications manager 720 is capable of, configured to, or operable to support a means for transmitting a second report indicating a capacity ratio metric for each codeword of the set of multiple codewords based on receiving the set of multiple codewords over the set of multiple spatial streams in accordance with the per codeword demodulation or the second type of demodulation.

By including or configuring the communications manager 720 in accordance with examples as described herein, the device 705 may support techniques for reporting of codeword capacity ratio metric values to enable reduced codeword processing complexity while limiting losses in throughput.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of reporting a per codeword capacity ratio metric for improved wireless communications as described herein, or the at least one processor 740 and the at least one memory 730 may be otherwise configured to, individually or collectively, perform or support such operations.

Figure 8:
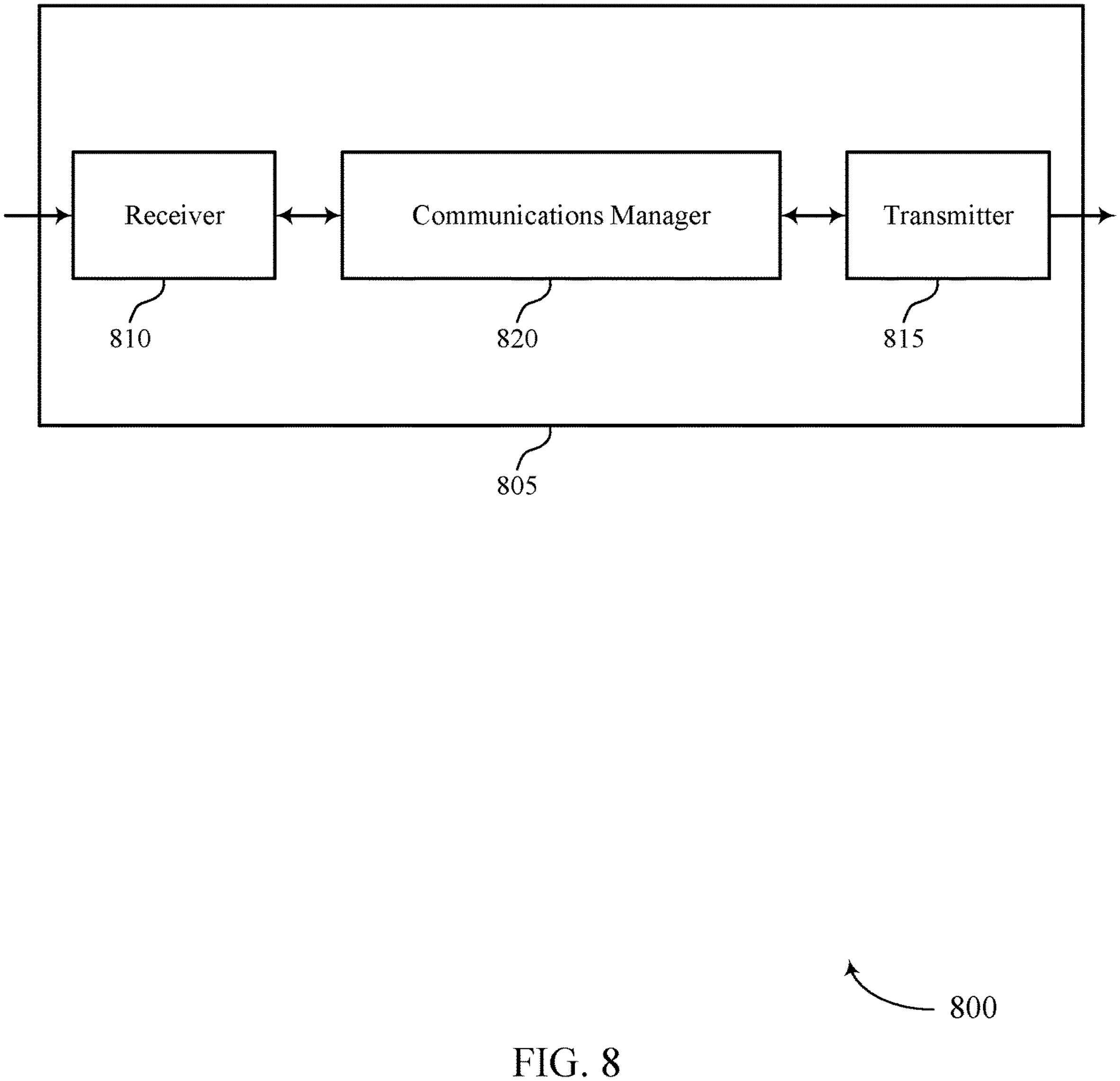
FIGS. 8 and 9 show block diagrams of devices that support reporting a per codeword capacity ratio metric for improved wireless communications in accordance with one or more aspects of the present disclosure.

FIG. 8 shows a block diagram 800 of a device 805 that supports reporting a per codeword capacity ratio metric for improved wireless communications in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of reporting a per codeword capacity ratio metric for improved wireless communications as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving a first report indicating a capability to support a first type of demodulation for a set of multiple codewords, a second type of demodulation for the set of multiple codewords, or both. The communications manager 820 is capable of, configured to, or operable to support a means for transmitting the set of multiple codewords over a set of multiple spatial streams based on receiving the first report. The communications manager 820 is capable of, configured to, or operable to support a means for receiving a second report indicating a capacity ratio metric for each codeword of the set of multiple codewords based on transmitting the set of multiple codewords over the set of multiple spatial streams.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reporting of codeword capacity ratio metric values to enable reduced codeword processing complexity while limiting losses in throughput.

Figure 9:
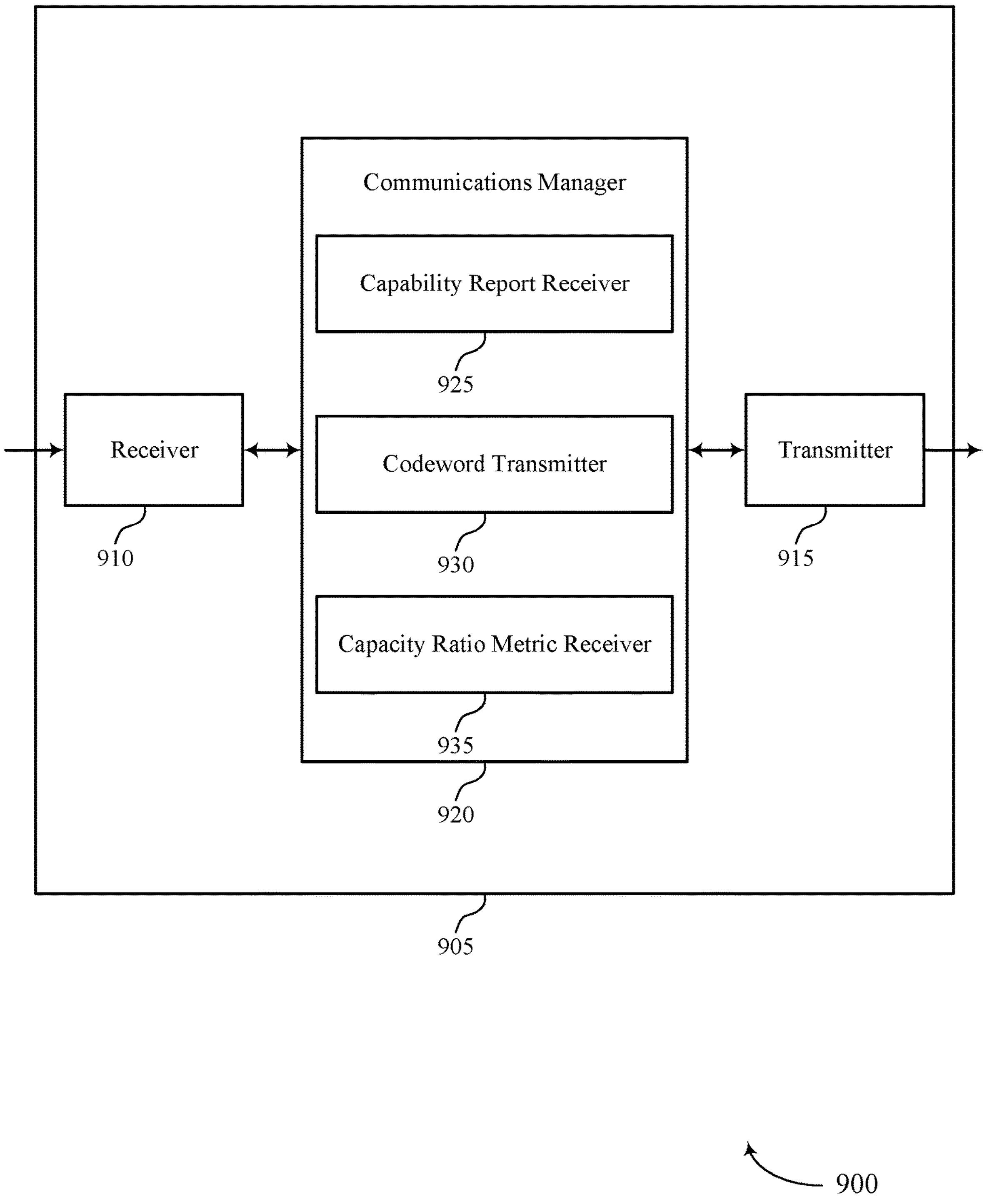

FIG. 9 shows a block diagram 900 of a device 905 that supports reporting a per codeword capacity ratio metric for improved wireless communications in accordance with one or more aspects of the present disclosure. The device 905 may be an example of aspects of a device 805 or a network entity 105 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of reporting a per codeword capacity ratio metric for improved wireless communications as described herein. For example, the communications manager 920 may include a capability report receiver 925, a codeword transmitter 930, a capacity ratio metric receiver 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The capability report receiver 925 is capable of, configured to, or operable to support a means for receiving a first report indicating a capability to support a first type of demodulation for a set of multiple codewords, a second type of demodulation for the set of multiple codewords, or both. The codeword transmitter 930 is capable of, configured to, or operable to support a means for transmitting the set of multiple codewords over a set of multiple spatial streams based on receiving the first report. The capacity ratio metric receiver 935 is capable of, configured to, or operable to support a means for receiving a second report indicating a capacity ratio metric for each codeword of the set of multiple codewords based on transmitting the set of multiple codewords over the set of multiple spatial streams.

Figure 10:
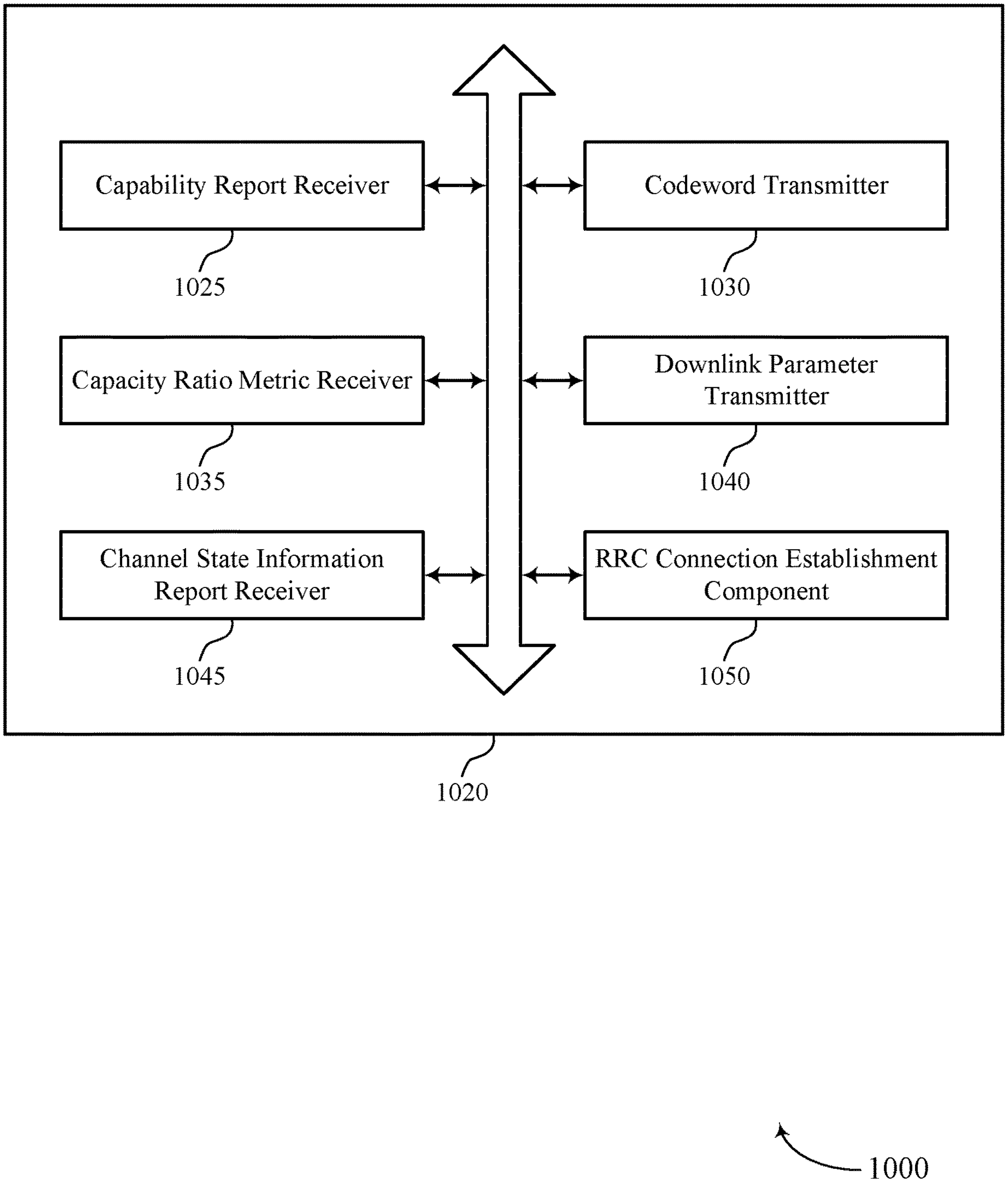
FIG. 10 shows a block diagram of a communications manager that supports reporting a per codeword capacity ratio metric for improved wireless communications in accordance with one or more aspects of the present disclosure.

FIG. 10 shows a block diagram 1000 of a communications manager 1020 that supports reporting a per codeword capacity ratio metric for improved wireless communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reporting a per codeword capacity ratio metric for improved wireless communications as described herein. For example, the communications manager 1020 may include a capability report receiver 1025, a codeword transmitter 1030, a capacity ratio metric receiver 1035, a downlink parameter transmitter 1040, a channel state information report receiver 1045, an RRC connection establishment component 1050, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The capability report receiver 1025 is capable of, configured to, or operable to support a means for receiving a first report indicating a capability to support a first type of demodulation for a set of multiple codewords, a second type of demodulation for the set of multiple codewords, or both. The codeword transmitter 1030 is capable of, configured to, or operable to support a means for transmitting the set of multiple codewords over a set of multiple spatial streams based on receiving the first report. The capacity ratio metric receiver 1035 is capable of, configured to, or operable to support a means for receiving a second report indicating a capacity ratio metric for each codeword of the set of multiple codewords based on transmitting the set of multiple codewords over the set of multiple spatial streams.

In some examples, the downlink parameter transmitter 1040 is capable of, configured to, or operable to support a means for transmitting an indication of one or more downlink parameters based on receiving the second report. In some examples, the codeword transmitter 1030 is capable of, configured to, or operable to support a means for transmitting a codeword in accordance with the one or more downlink parameters based on transmitting the indication of the one or more downlink parameters.

In some examples, the one or more downlink parameters include a modulation and coding scheme, a rank, a parameter associated with precoding, or any combination thereof.

In some examples, the channel state information report receiver 1045 is capable of, configured to, or operable to support a means for receiving a channel state information report, where the channel state information report includes the second report.

In some examples, the channel state information report receiver 1045 is capable of, configured to, or operable to support a means for receiving a channel state information report associated with the set of multiple codewords, where the second report is received in uplink control information that differs from the channel state information report.

In some examples, the RRC connection establishment component 1050 is capable of, configured to, or operable to support a means for performing radio resource control connection establishment after receiving the first report.

In some examples, the second report includes a first set of multiple bits that indicates a first capacity ratio metric for a first codeword of the set of multiple codewords and a second set of multiple bits that indicates a second capacity ratio metric for a second codeword of the set of multiple codewords.

In some examples, the second report is received based on a rank associated with the set of multiple codewords being greater than a threshold.

In some examples, the second type of demodulation includes full rank demodulation.

Figure 11:
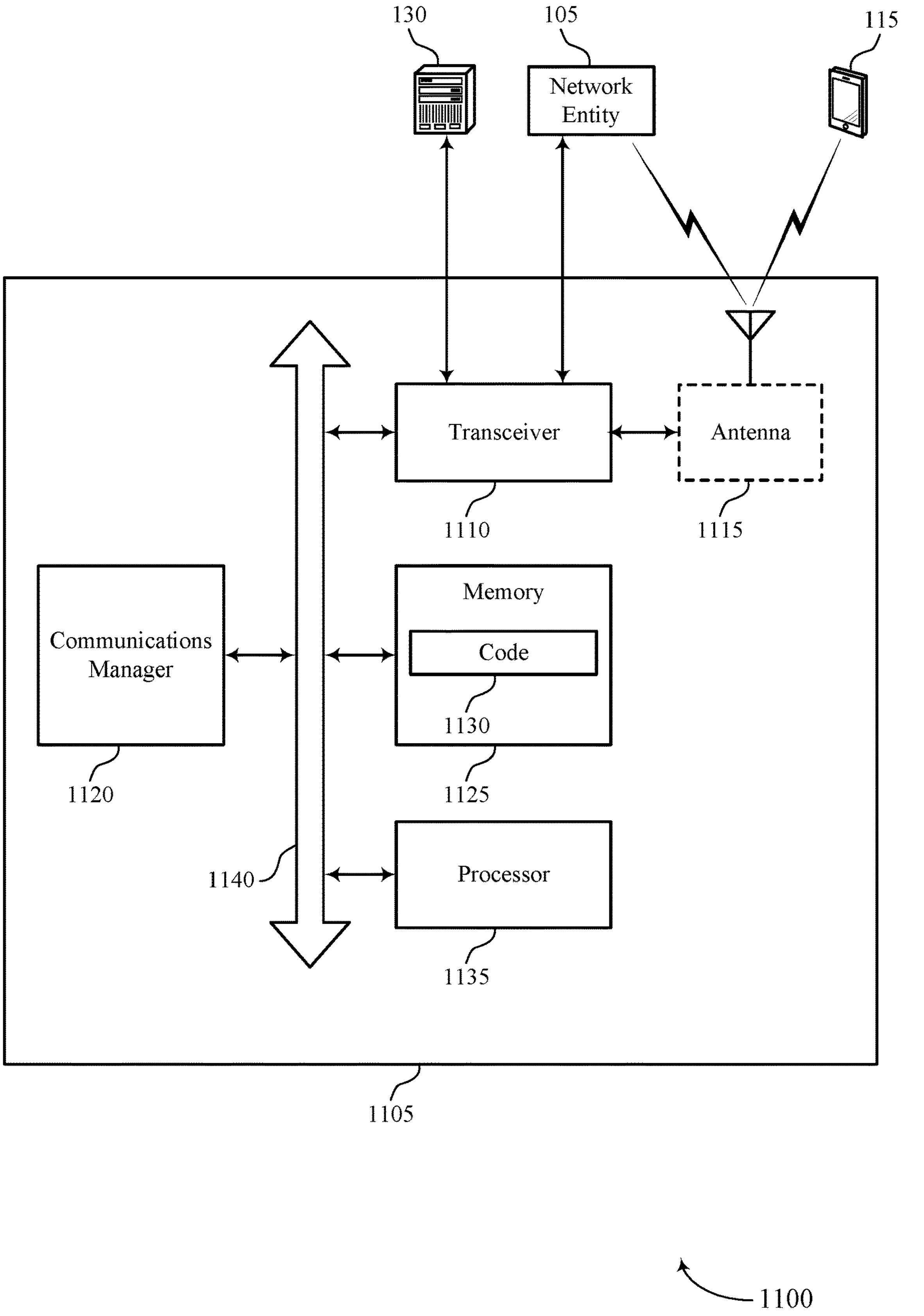
FIG. 11 shows a diagram of a system including a device that supports reporting a per codeword capacity ratio metric for improved wireless communications in accordance with one or more aspects of the present disclosure.

FIG. 11 shows a diagram of a system 1100 including a device 1105 that supports reporting a per codeword capacity ratio metric for improved wireless communications in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device

1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting reporting a per codeword capacity ratio metric for improved wireless communications). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for receiving a first report indicating a capability to support a first type of demodulation for a set of multiple codewords, a second type of demodulation for the set of multiple codewords, or both. The communications manager 1120 is capable of, configured to, or operable to support a means for transmitting the set of multiple codewords over a set of multiple spatial streams based on receiving the first report. The communications manager 1120 is capable of, configured to, or operable to support a means for receiving a second report indicating a capacity ratio metric for each codeword of the set of multiple codewords based on transmitting the set of multiple codewords over the set of multiple spatial streams.

By including or configuring the communications manager 1120 in accordance with examples as described herein, the device 1105 may support techniques for reporting of codeword capacity ratio metric values to enable reduced codeword processing complexity while limiting losses in throughput.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of reporting a per codeword capacity ratio metric for improved wireless communications as described herein, or the at least one processor 1135 and the at least one memory 1125 may be otherwise configured to, individually or collectively, perform or support such operations.

Figure 12:
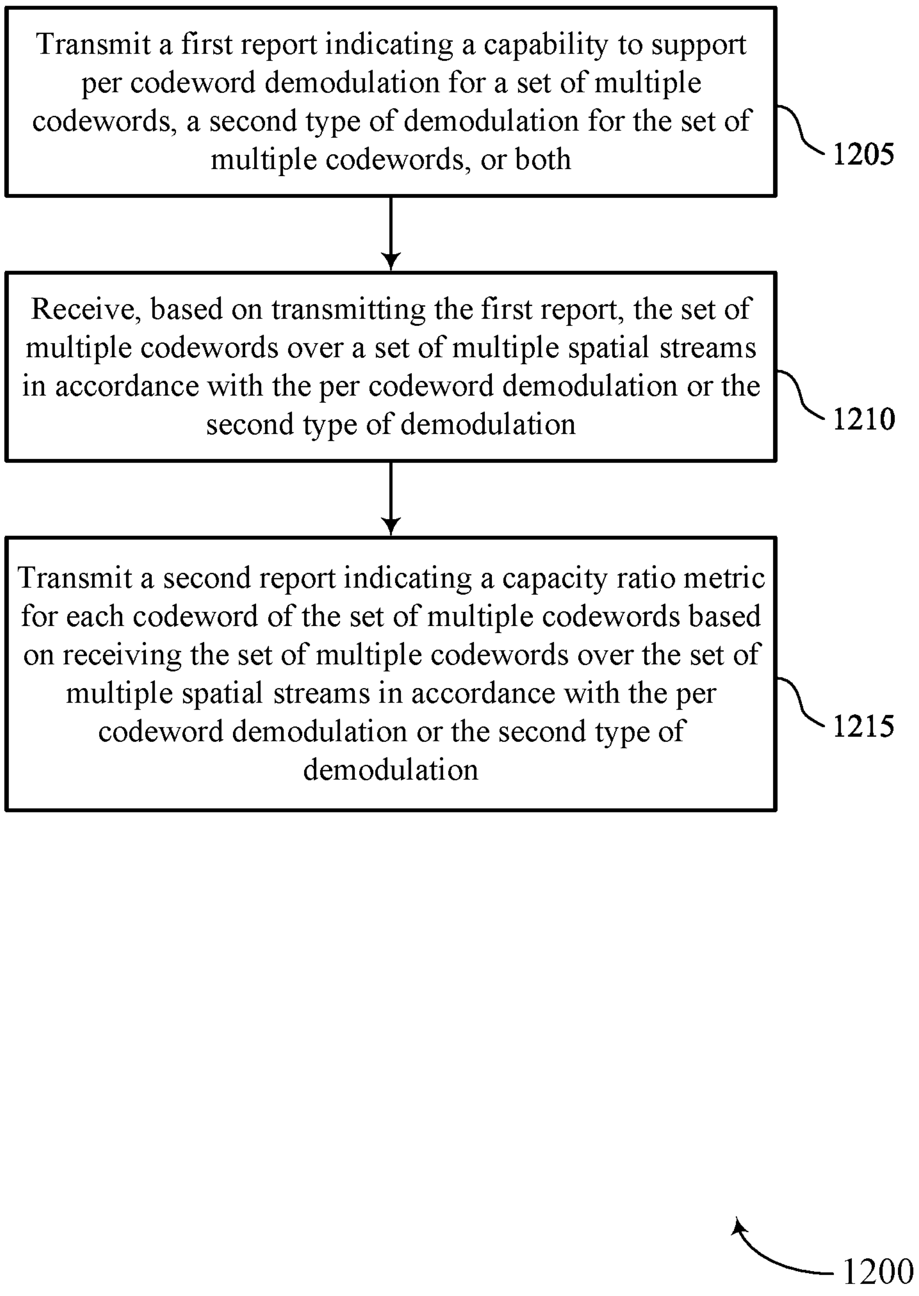
FIGS. 12 and 13 show flowcharts illustrating methods that support reporting a per codeword capacity ratio metric for improved wireless communications in accordance with one or more aspects of the present disclosure.

FIG. 12 shows a flowchart illustrating a method 1200 that supports reporting a per codeword capacity ratio metric for improved wireless communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting a first report indicating a capability to support per codeword demodulation for a set of multiple codewords, a second type of demodulation for the set of multiple codewords, or both. The operations of block 1205 may be performed in accordance with examples as disclosed herein. In some examples, aspects of the operations of 1205 may be performed by a capability report transmitter 625 as described with reference to FIG. 6.

At 1210, the method may include receiving, based on transmitting the first report, the set of multiple codewords over a set of multiple spatial streams in accordance with the per codeword demodulation or the second type of demodulation. The operations of block 1210 may be performed in accordance with examples as disclosed herein. In some examples, aspects of the operations of 1210 may be performed by a codeword receiver 630 as described with reference to FIG. 6.

At 1215, the method may include transmitting a second report indicating a capacity ratio metric for each codeword of the set of multiple codewords based on receiving the set of multiple codewords over the set of multiple spatial streams in accordance with the per codeword demodulation or the second type of demodulation. The operations of block 1215 may be performed in accordance with examples as disclosed herein. In some examples, aspects of the operations of 1215 may be performed by a capacity ratio metric report transmitter 635 as described with reference to FIG. 6.

Figure 13:
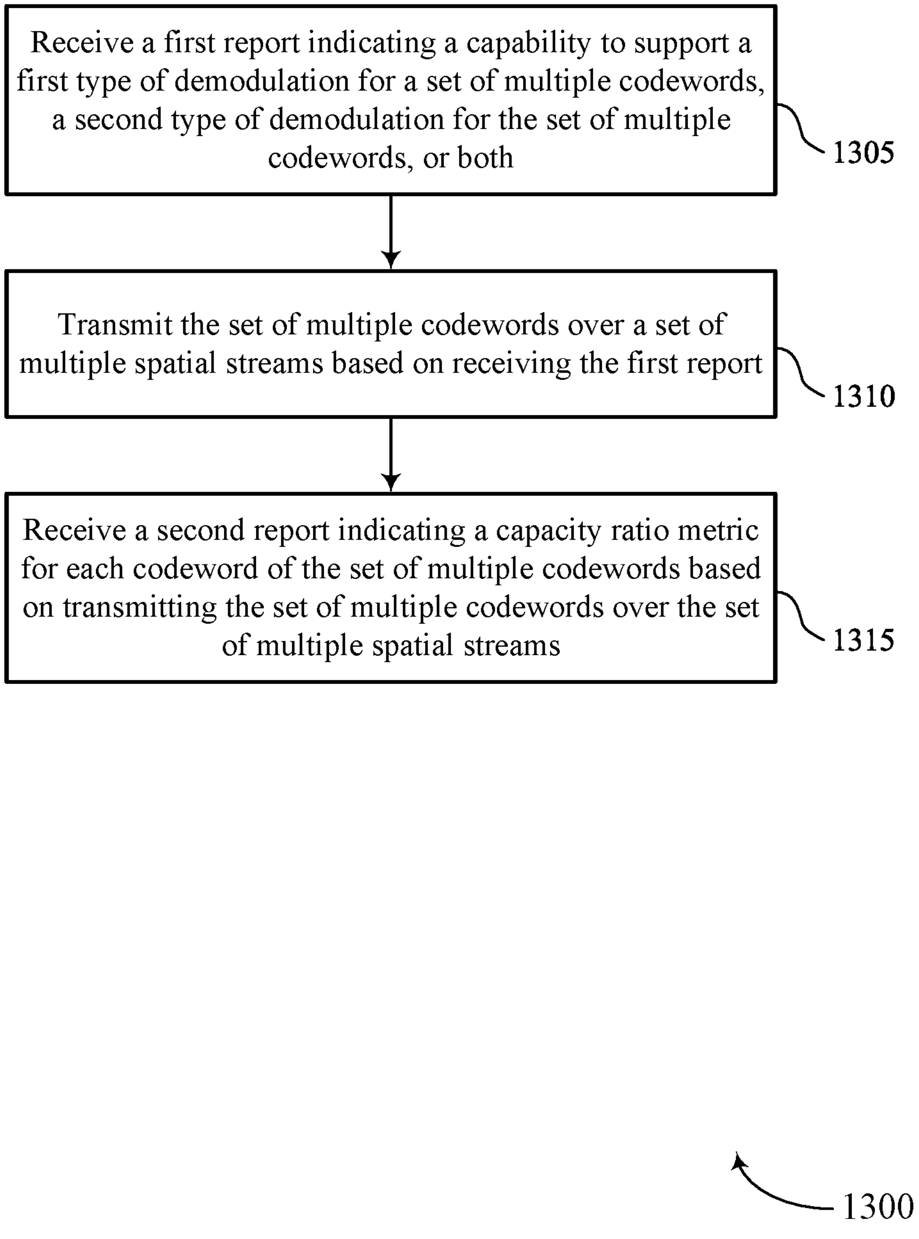

FIG. 13 shows a flowchart illustrating a method 1300 that supports reporting a per codeword capacity ratio metric for improved wireless communications in accordance with aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include receiving a first report indicating a capability to support a first type of demodulation for a set of multiple codewords, a second type of demodulation for the set of multiple codewords, or both. The operations of block 1305 may be performed in accordance with examples as disclosed herein. In some examples, aspects of the operations of 1305 may be performed by a capability report receiver 1025 as described with reference to FIG. 10.

At 1310, the method may include transmitting the set of multiple codewords over a set of multiple spatial streams based on receiving the first report. The operations of block 1310 may be performed in accordance with examples as disclosed herein. In some examples, aspects of the operations of 1310 may be performed by a codeword transmitter 1030 as described with reference to FIG. 10.

At 1315, the method may include receiving a second report indicating a capacity ratio metric for each codeword of the set of multiple codewords based on transmitting the set of multiple codewords over the set of multiple spatial streams. The operations of block 1315 may be performed in accordance with examples as disclosed herein. In some examples, aspects of the operations of 1315 may be performed by a capacity ratio metric receiver 1035 as described with reference to FIG. 10.

The following provides an overview of aspects of the present disclosure:

Aspect 1: A method for wireless communications at a UE, comprising: transmitting a first report indicating a capability to support per codeword demodulation for a plurality of codewords, a second type of demodulation for the plurality of codewords, or both; receiving, based at least in part on transmitting the first report, the plurality of codewords over a plurality of spatial streams in accordance with the per codeword demodulation or the second type of demodulation; and transmitting a second report indicating a capacity ratio metric for each codeword of the plurality of codewords based at least in part on receiving the plurality of codewords over the plurality of spatial streams in accordance with the per codeword demodulation or the second type of demodulation.

Aspect 2: The method of aspect 1, further comprising: receiving an indication of one or more downlink parameters based at least in part on transmitting the second report; and receiving a codeword in accordance with the one or more downlink parameters.

Aspect 3: The method of aspect 2, wherein the one or more downlink parameters comprise a modulation and coding scheme, a rank, a parameter associated with precoding, or any combination thereof.

Aspect 4: The method of any of aspects 1 through 3, further comprising: transmitting a channel state information report, wherein the channel state information report comprises the second report.

Aspect 5: The method of any of aspects 1 through 4, further comprising: transmitting a channel state information report associated with the plurality of codewords, wherein the second report is transmitted in uplink control information that differs from the channel state information report.

Aspect 6: The method of any of aspects 1 through 5, further comprising: receiving, after transmitting the second report, a second plurality of codewords in accordance with the second type of demodulation, wherein the plurality of codewords is received in accordance with the per codeword demodulation.

Aspect 7: The method of any of aspects 1 through 6, further comprising: performing radio resource control connection establishment after transmitting the first report.

Aspect 8: The method of any of aspects 1 through 7, wherein the second report comprises a first plurality of bits that indicates a first capacity ratio metric for a first codeword of the plurality of codewords and a second plurality of bits that indicates a second capacity ratio metric for a second codeword of the plurality of codewords.

Aspect 9: The method of any of aspects 1 through 8, wherein the second report is transmitted based at least in part on a rank associated with the plurality of codewords being greater than a threshold.

Aspect 10: The method of any of aspects 1 through 9, wherein the second type of demodulation comprises full rank demodulation.

Aspect 11: A method for wireless communications at a network entity, comprising: receiving a first report indicating a capability to support a first type of demodulation for a plurality of codewords, a second type of demodulation for the plurality of codewords, or both; transmitting the plurality of codewords over a plurality of spatial streams based at least in part on receiving the first report; and receiving a second report indicating a capacity ratio metric for each codeword of the plurality of codewords based at least in part on transmitting the plurality of codewords over the plurality of spatial streams.

Aspect 12: The method of aspect 11, further comprising: transmitting an indication of one or more downlink parameters based at least in part on receiving the second report; and transmitting a codeword in accordance with the one or more downlink parameters based at least in part on transmitting the indication of the one or more downlink parameters.

Aspect 13: The method of aspect 12, wherein the one or more downlink parameters comprise a modulation and coding scheme, a rank, a parameter associated with precoding, or any combination thereof.

Aspect 14: The method of any of aspects 11 through 13, further comprising: receiving a channel state information report, wherein the channel state information report comprises the second report.

Aspect 15: The method of any of aspects 11 through 14, further comprising: receiving a channel state information report associated with the plurality of codewords, wherein the second report is received in uplink control information that differs from the channel state information report.

Aspect 16: The method of any of aspects 11 through 15, further comprising: performing radio resource control connection establishment after receiving the first report.

Aspect 17: The method of any of aspects 11 through 16, wherein the second report comprises a first plurality of bits that indicates a first capacity ratio metric for a first codeword of the plurality of codewords and a second plurality of bits that indicates a second capacity ratio metric for a second codeword of the plurality of codewords.

Aspect 18: The method of any of aspects 11 through 17, wherein the second report is received based at least in part on a rank associated with the plurality of codewords being greater than a threshold.

Aspect 19: The method of any of aspects 11 through 18, wherein the second type of demodulation comprises full rank demodulation.

Aspect 20: A UE for wireless communications, comprising one or more memories storing processor-executable code, and one or more processors coupled with the one or more memories and individually or collectively operable to execute the code to cause the UE to perform a method of any of aspects 1 through 10.

Aspect 21: A UE for wireless communications, comprising at least one means for performing a method of any of aspects 1 through 10.

Aspect 22: A non-transitory computer-readable medium storing code for wireless communications, the code comprising instructions executable by a processor to perform a method of any of aspects 1 through 10.

Aspect 23: A network entity for wireless communications, comprising one or more memories storing processor-executable code, and one or more processors coupled with the one or more memories and individually or collectively operable to execute the code to cause the network entity to perform a method of any of aspects 11 through 19.

Aspect 24: A network entity for wireless communications, comprising at least one means for performing a method of any of aspects 11 through 19.

Aspect 25: A non-transitory computer-readable medium storing code for wireless communications, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit, to a network entity, a first report indicating a capability to support per codeword demodulation for a plurality of codewords, a second type of demodulation for the plurality of codewords, or both;

receive, from the network entity, based at least in part on transmission of the first report, the plurality of codewords over a plurality of spatial streams in accordance with the per codeword demodulation or the second type of demodulation; and transmit, to the network entity, a second report indicating a capacity ratio metric for each codeword of the plurality of codewords based at least in part on receipt of the plurality of codewords over the plurality of spatial streams in accordance with the per codeword demodulation or the second type of demodulation.

2. The UE of claim 1, wherein the one or more processors are individually or collectively further operable to execute the code to cause the UE to:

receive, from the network entity, an indication of one or more downlink parameters based at least in part on transmission of the second report; and receive, from the network entity, a codeword in accordance with the one or more downlink parameters.

3. The UE of claim 2, wherein the one or more downlink parameters comprise a modulation and coding scheme, a rank, a parameter associated with precoding, or any combination thereof.

4. The UE of claim 1, wherein the one or more processors are individually or collectively further operable to execute the code to cause the UE to:

transmit, to the network entity, a channel state information report, wherein the channel state information report comprises the second report.

5. The UE of claim 1, wherein the one or more processors are individually or collectively further operable to execute the code to cause the UE to:

transmit, to the network entity, a channel state information report associated with the plurality of codewords, wherein the second report is transmitted in uplink control information that differs from the channel state information report.

6. The UE of claim 1, wherein the one or more processors are individually or collectively further operable to execute the code to cause the UE to:

receive, from the network entity, after transmission of the second report, a second plurality of codewords in accordance with the second type of demodulation, wherein the plurality of codewords is received in accordance with the per codeword demodulation.

7. The UE of claim 1, wherein the one or more processors are individually or collectively further operable to execute the code to cause the UE to:

perform radio resource control connection establishment after transmission of the first report.

8. The UE of claim 1, wherein the second report comprises a first plurality of bits that indicates a first capacity ratio metric for a first codeword of the plurality of codewords and a second plurality of bits that indicates a second capacity ratio metric for a second codeword of the plurality of codewords.

9. The UE of claim 1, wherein the second report is transmitted to the network entity based at least in part on a rank associated with the plurality of codewords being greater than a threshold.

10. The UE of claim 1, wherein:

the second type of demodulation comprises full rank demodulation.

11. A network entity, comprising:

one or more memories storing processor-executable code; and one or more processors coupled with the one or more memories and individually or collectively operable to execute the code to cause the network entity to:

receive, from a UE, a first report indicating a capability to support a first type of demodulation for a plurality of codewords, a second type of demodulation for the plurality of codewords, or both;

transmit, to the UE, the plurality of codewords over a plurality of spatial streams based at least in part on receipt of the first report; and receive, from the UE, a second report indicating a capacity ratio metric for each codeword of the plurality of codewords based at least in part on transmission of the plurality of codewords over the plurality of spatial streams.

12. The network entity of claim 11, wherein the one or more processors are individually or collectively further operable to execute the code to cause the network entity to:

transmit, to the UE, an indication of one or more downlink parameters based at least in part on receipt of the second report; and transmit, to the UE, a codeword in accordance with the one or more downlink parameters based at least in part on the indication of the one or more downlink parameters.

13. The network entity of claim 12, wherein the one or more downlink parameters comprise a modulation and coding scheme, a rank, a parameter associated with precoding, or any combination thereof.

14. The network entity of claim 11, wherein the one or more processors are individually or collectively further operable to execute the code to cause the network entity to:

receive, from the UE, a channel state information report, wherein the channel state information report comprises the second report.

15. The network entity of claim 11, wherein the one or more processors are individually or collectively further operable to execute the code to cause the network entity to:

receive, from the UE, a channel state information report associated with the plurality of codewords, wherein the second report is received in uplink control information that differs from the channel state information report.

16. The network entity of claim 11, wherein the one or more processors are individually or collectively further operable to execute the code to cause the network entity to:

perform radio resource control connection establishment after receipt of the first report.

17. The network entity of claim 11, wherein the second report comprises a first plurality of bits that indicates a first capacity ratio metric for a first codeword of the plurality of codewords and a second plurality of bits that indicates a second capacity ratio metric for a second codeword of the plurality of codewords.

18. The network entity of claim 11, wherein the second report is received from the UE based at least in part on a rank associated with the plurality of codewords being greater than a threshold.

19. The network entity of claim 11, wherein:
the second type of demodulation comprises full rank demodulation.

20. A method for wireless communications at a user equipment (UE), comprising:
transmitting, to a network entity, a first report indicating a capability to support per codeword demodulation for a plurality of codewords, a second type of demodulation for the plurality of codewords, or both;
receiving, from the network entity, based at least in part on transmitting the first report, the plurality of codewords over a plurality of spatial streams in accordance with the per codeword demodulation or the second type of demodulation; and
transmitting, to the network entity, a second report indicating a capacity ratio metric for each codeword of the plurality of codewords based at least in part on receiving the plurality of codewords over the plurality of spatial streams in accordance with the per codeword demodulation or the second type of demodulation.

21. The method of claim 20, further comprising:
receiving, from the network entity, an indication of one or more downlink parameters based at least in part on transmitting the second report; and
receiving a codeword in accordance with the one or more downlink parameters.

22. The method of claim 21, wherein the one or more downlink parameters comprise a modulation and coding scheme, a rank, a parameter associated with precoding, or any combination thereof.

23. The method of claim 20, further comprising:
transmitting, to the network entity, a channel state information report,
wherein the channel state information report comprises the second report.

24. The method of claim 20, further comprising:
transmitting, to the network entity, a channel state information report associated with the plurality of codewords,
wherein the second report is transmitted in uplink control information that differs from the channel state information report.

25. The method of claim 20, further comprising:
receiving, from the network entity, after transmitting the second report, a second plurality of codewords in accordance with the second type of demodulation,
wherein the plurality of codewords is received in accordance with the per codeword demodulation.

26. The method of claim 20, further comprising:
performing radio resource control connection establishment after transmitting the first report.

27. The method of claim 20, wherein the second report comprises a first plurality of bits that indicates a first capacity ratio metric for a first codeword of the plurality of codewords and a second plurality of bits that indicates a second capacity ratio metric for a second codeword of the plurality of codewords.

28. The method of claim 20, wherein the second report is transmitted to the network entity based at least in part on a rank associated with the plurality of codewords being greater than a threshold.

29. The method of claim 20, wherein the second type of demodulation comprises full rank demodulation.

30. A method for wireless communications at a network entity, comprising:
receiving, from a UE, a first report indicating a capability to support a first type of demodulation for a plurality of codewords, a second type of demodulation for the plurality of codewords, or both;
transmitting, to the UE, the plurality of codewords over a plurality of spatial streams based at least in part on receiving the first report; and
receiving, from the UE, a second report indicating a capacity ratio metric for each codeword of the plurality of codewords based at least in part on transmitting the plurality of codewords over the plurality of spatial streams.

* * * * *